Jan. 22, 1963 A. J. LISICKY 3,075,189
RADAR
Filed Sept. 8, 1958 5 Sheets-Sheet 1
Fig. 1.
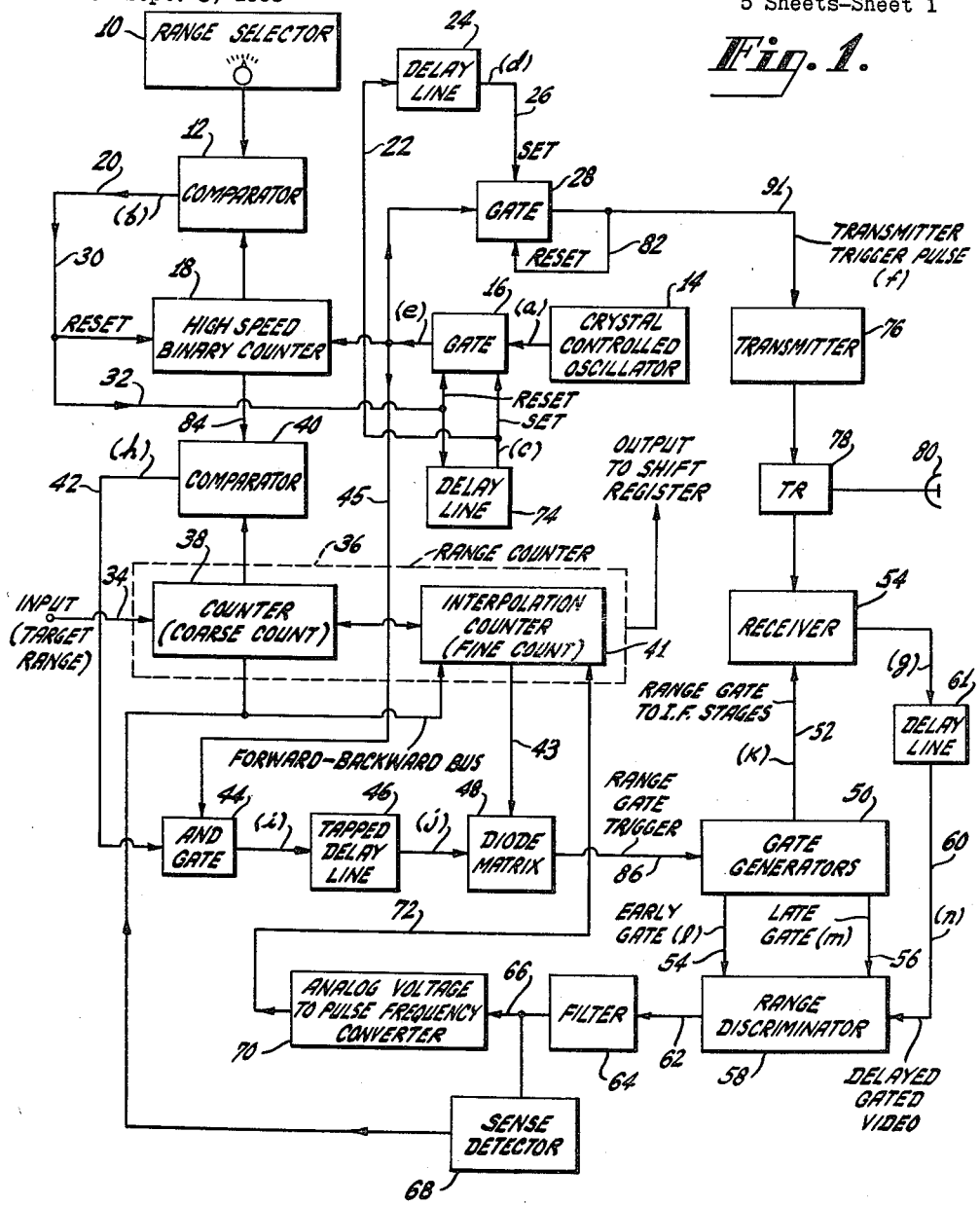
INVENTOR.
ANTON J. LISICKY
BY
ATTORNEY

INVENTOR.
ANTON J. LISICKY

Jan. 22, 1963 A. J. LISICKY 3,075,189
RADAR
Filed Sept. 8, 1958 5 Sheets-Sheet 4

INVENTOR.
ANTON J. LISICKY
BY
ATTORNEY

INVENTOR.
ANTON J. LISICKY

United States Patent Office 3,075,189
Patented Jan. 22, 1963

3,075,189
RADAR
Anton J. Lisicky, Haddonfield, N.J., assignor to Radio Corporation of America, a corporation of Delaware
Filed Sept. 8, 1958, Ser. No. 759,646
18 Claims. (Cl. 343—7.3)

The present invention relates to an improved radar system and particularly to an improved automatic range tracking radar system.

With the advent of high speed missiles and high speed aircraft, a need has arisen for improved range tracking radar system performance. One area requiring improvement, for example, is range slewing speed. In one known electromechanical range tracking system the highest speed of range slewing is on the order of 50,000 yards per second. For targets moving at or close to missile speeds this figure must be improved so that far-away targets can be "acquired" quickly. Target "acquisition" refers to the ability of the radar system to lock on to a particular target in space—a prerequisite to automatic target tracking.

Improvements must also be made in system range capability. Present systems, for example, are designed for ranges of the order of hundreds of miles, whereas the ranges now of interest are of the order of several thousand miles. At these long ranges, the required range accuracy can be preserved in present systems only by the use of expensive and complex multiple scale analog timing systems. Other limitations in present systems include the need for analog-to-digital conversion, the need for precision gear assembly and resolver units, and others to be outlined in more detail later.

An object of the invention is to provide an improved range tracking radar system having a range slewing speed which is orders of magnitude faster than that of known systems.

Another object of the invention is to provide an improved radar system the maximum range of which can be selected at will in small discrete steps.

Another object of the invention is to provide an improved range tracking radar system which produces an output in binary form which can be applied directly to a digital computer.

Another object of the invention is to provide an improved range tracking radar system which is extremely accurate—even at ranges of several thousand miles or more, and in which the range accuracy is substantially unaffected as the range is increased.

Another object of the invention is to provide a range tracking radar system which is highly reliable and which uses only relatively few basic computer component circuits.

The present invention is an all-electronic radar ranging system and it employs digital techniques. A binary number is produced which represents the maximum radar range of interest. This number can be changed at will in discrete steps. A second binary number is produced the value of which increases as a function of time. This number may be produced, for example, by applying clock pulses to a high-speed binary counter. The two binary numbers are compared and, when they are equal, an output signal is produced which can be used to reset the high-speed counter and to initiate the transmitted radar pulse. A third binary number is produced which is representative of the range of the target of interest. The second binary number (the one which increases in value as a function of time) is compared with the third binary number and, when they are equal, a gate is produced which brackets the position of the target of interest. If the target range should change, an error voltage is produced which is converted to a count which, in turn, is applied to correct the third binary number. The correction is in a sense to maintain the gate bracketing the target position. The third binary number is a continuous indication of target range. It may be applied directly to a computer.

The invention will be described in greater detail by reference to the following description taken in connection with the accompanying drawing in which:

FIG. 1 is a block circuit diagram of a preferred form of the present invention;

Throughout the figures similar reference numerals are applied to similar elements.

Figure 2:
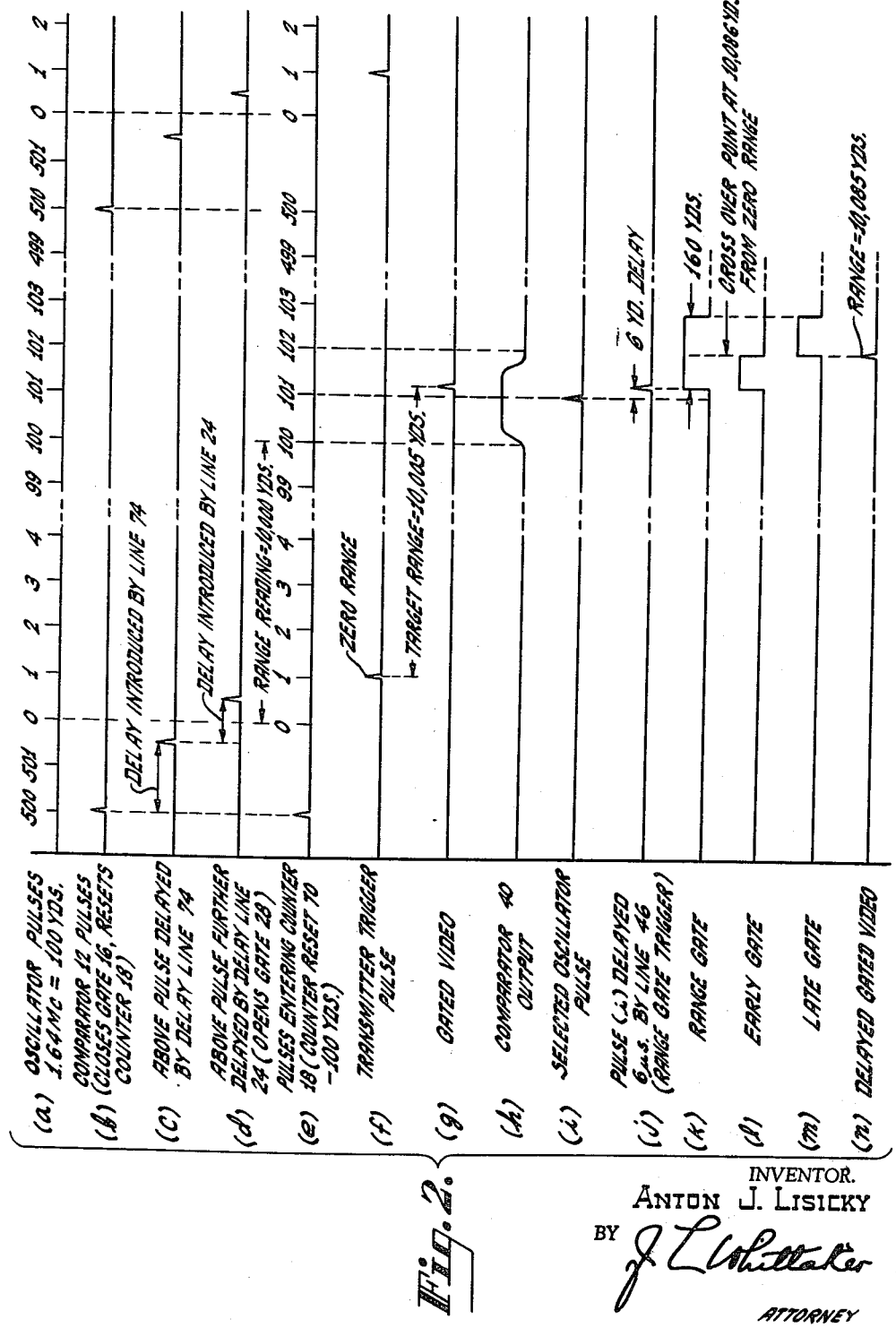
FIG. 2 is a drawing of waveforms present at various points in the circuit of FIG. 1.

FIG. 1 should be referred to first. Range selector 10 produces a binary number indicative of the maximum radar range of interest. It may, for example, consist of a voltage source and a plurality of two position switches, one position of which is indicative of the digit 0 and the other of which is indicative of the digit 1. Alternatively, the range selector may consist of all electronic components such as a plurality of flip-flop stages connected in cascade in well known manner. When one element of the flip-flop conducts, it represents the digit 0 and when the other conducts, it represents the digit 1. The range selector is connected to a comparator 12. Although only one lead is shown, it is to be understood that here and in other places in the circuit the single lead may represent a plurality of leads. In the specific connection between blocks 10 and 12, as a matter of fact, there are two leads for each binary digit.

Going now to the upper right portion of FIG. 1, a crystal-controlled oscillator 14 applies clock pulses $a$ through gate 16 to a high-speed binary counter 18. Pulses $a$ and other waves discussed below are shown in FIG. 2. The separation between pulses is representative of a coarse range increment. It may be assumed, for purposes of the present discussion, that the oscillator frequency is 1.64 megacycles so that the pulses it produces are spaced the time equivalent of 100 yards apart. It may be assumed, for the time being, that gate 16 is open. High-speed binary counter stage 18 counts the input pulses and produces a binary number representative of the number of such pulses it receives. The counter 18 is, of course, a well known computer component and may consist of flip-flop stages connected in cascade.

Comparator 12, which is composed of well known computer elements, compares the voltages indicative of the binary number set up in stage 10 with the voltages indicative of the binary number produced by stage 18 and, when they are equal, produces an output pulse $b$ at lead 20. (In the discussion which follows, in cases where voltages, currents or other manifestations of binary numbers are operated on (compared, added, etc.) it will be stated that the binary numbers themselves are operated on in the interest of brevity.) This pulse $b$ is applied via leads 30 and 32 to reset or close gate 16 thereby preventing further pulses from oscillator 14 from entering binary counter 18. It is also applied via lead 30 as a reset pulse to the binary counter 18. In other words, this pulse changes the states of all the flip-flop circuits in stage 18 so that they all represent the digit 0 or a convenient number. This same pulse is also applied to delay circuit 74 which then sets or opens gate 16, permitting pulses $a$ from oscillator 14 to enter binary counter 18, thus repeating the process. The set pulse $c$ from delay circuit 74 is also applied via lead 22 to delay circuit 24.

The range of the target of interest, which may be determined by means not shown in the figure, is applied via lead 34 to the range counter shown by dashed block 36. The lead 34 is merely a schematic representation of the input to the range counter 36. As one example, the lead may represent an input from a shift register which has had information in digital form as to the range of the target of interest applied to it from another radar system at a distant location. Alternatively, the lead 34 may represent an input for pulses under the influence of a control knob which is manually actuated by an operator who has been informed of the range of the target or who has been observing the target on an indicator of the long range early warning radar system.

It should be mentioned here that information as to the azimuth and elevation angle of the target is also available and has been previously applied to the radar system so that the antenna has its directive beam pointed at the target. Since this portion of the system may be of conventional type and is not part of the present invention, it is not discussed in further detail.

Range counter 36 includes a coarse stage 38 and an interpolation or fine stage 41. The coarse stage 38 produces a binary number the digits of which represent 100 yard increments just like the digits of the counter stage 18 previously discussed and the digits of range selector 10. The interpolation counter 41 produces a binary number which represents discrete fractions of 100 yards. For example, if there are five stages in interpolation counter 41, it is capable of producing a binary number which has five digits that is, one which can represent any one of $2^5$ (32) different values. Thus, each digit can represent on the order of $\frac{1}{32}$ of 100 yards or 3 and a fraction yards. If greater accuracy is required, additional stages can be added and the range increment reduced accordingly. For example, the addition of a single stage will halve the fine range interval, that is, change it from approximately 3 yards to approximately 1½ yards.

The binary number produced by coarse stage 38 is compared in comparator stage 40 with the binary number produced by the high speed binary counter stage 18. When the two numbers equal, the comparator 40 produces an output pulse $h$ (see FIG. 2$h$) at lead 42. This output pulse is preferably slightly less than 200 yards wide and it is applied to "and" gate 44. The second input to the "and" gate consists of the pulses from crystal controlled oscillator 14 which are applied via gate 16 and lead 45.

When the pulse $h$ coincides in time with one of the pulses from oscillator 14, "and" gate 44 passes that oscillator pulse $i$ to a tapped delay line 46. The output pulse $j$ appearing on one of the taps of the delay line is passed by a diode matrix circuit 48 to the early and late gate generators shown as a single block 50. This last stage produces three outputs. One is a range gate which, if the binary number produced by the range counter 36 is the correct target range, brackets the target. It is applied via lead 52 to the radar receiver 54. The other two are early and late gates or simply the range gate split into two equal parts one of which should occur slightly ahead of the target and the other slightly beyond the target if the range gate is centered on the target. In other words, the target range should be at the cross-over point of the early and late gates. The time relationship and relative durations of the three waves is shown in somewhat idealized form in FIGS. 2$k$, $l$, $m$. The early and late gates are applied via leads 54 and 56 respectively to the range discriminator 58. The third input to the range discriminator is the echo pulse $g$ from receiver 54 which is applied via lead 60.

The range discriminator, also known as a time discriminator, is a conventional element. Its function is to produce an output voltage at lead 62 which has a sense and amplitude indicative of the range error. In other words, if the early and late gates properly bracket the target, the output voltage of the range discriminator should be zero volts. If the target is under-ranged, the output voltage will, for example, be positive and if it is overranged, the output voltage will, for example, be negative. The filter 64 smooths the output voltage of the range discriminator in conventional fashion so that a direct voltage is available at lead 66. It is also the equalizer element in the closed loop and thus determines the bandwidth and the stability of the system. This direct voltage is either zero, positive or negative and it is applied to a sense detector 68. The latter functions to place the counter stage 36 in condition to count forward or backward, as may be required. In other words, if the direct voltage at lead 66 is of one sense or zero, the counter will be set to count forward and if it is of the opposite sense, the counter is set to count backward.

The direct voltage at lead 66 is also applied to analog voltage-to-pulse frequency converter stage 70. The function of this stage is to convert the direct voltage to pulses. The greater the amplitude of the direct voltage, the greater the output pulse frequency from stage 70. These output pulses are applied via lead 72 to range counter 36 where they change the number in range counter 36. During the next radar repetition period, the coarse stage 38 of the range counter 36 will select the proper oscillator pulse; the fine stage 41 will select the appropriate tap on the delay line thus producing a pulse at the output of the diode matrix 48 but at the correct range position. Since a closed loop is present, the range gate tends to be centered on the target return.

The operation of the complete system will now be discussed. In a practical system, the range selector 10 may produce 15 to 20 or more binary digits, each representative of a discrete range interval such as 100 to 200 yards. As an example, if there are 15 binary digits, there are $2^{15}$ or 32,768 binary numbers, possible. If each digit represents 100 yards, then the maximum radar range possible is approximately 1850 miles. If one additional binary stage is added, the range is doubled, etc. To simplify the present discussion, however, it will be assumed that the maximum range is 50,000 yards. It will also be assumed that there is a target at 10,005 yards.

Initially, let it be assumed that the radar system shown in FIG. 1 produces an output pulse $b$ from comparator 12 at the time equivalent of 50,000 yards. It is also assumed that the range counter 36 has been set to a range of 10,000 yards. The output pulse $b$ of comparator 12 closes gate 16 and is used to reset the high-speed binary counter 18. The binary counter 18 can be reset to zero or, if desired, to $-1$ ($-100$ yards) so that on receiving the first pulse from gate 16, the high-speed counter will indicate zero. The latter timing scheme is the one shown in FIG. 2. After binary counter 18 is reset, the output pulse $b$ of comparator 12 passes through delay line 74 and the delayed pulse $c$ opens gate 16. The transmitter trigger pulse $f$ is selected from one of the pulses which pass through gate 16. In the system illustrated, the 100 yard pulse is utilized as the transmitter trigger pulse. To open gate 28 at the appropriate time, either pulse $b$ or pulse $c$ can be delayed. In the embodiment shown, pulse $c$ on lead 22 is the one applied to delay line 24. After the selected pulse for the transmitter trigger passes through gate 28, the same pulse is used to close gate 28. The trigger pulse is applied to the modulator stage of the transmitter and causes the transmitter to produce a high-power, radio-frequency pulse which begins in time coincidence with the second (the 100 yard) pulse. Thus, zero range in the system corresponds to the second pulse. This pulse passes through transmit-receive device 78 and is radiated by directive antenna 80. The antenna is rotatable in azimuth and adjustable in elevation and it may be assumed that it is directed at the target of interest, that is, the one located at 10,005 yards.

The pulses radiated by antenna 80 strike the target at 10,005 yards and are reflected back toward the antenna. These pass through the transmit-receive device 78 to the receiver 54.

Summarizing the operation so far, the transmitter has produced a pulse at zero time and this has been radiated by antenna 80. The receiver has received an echo at a time equivalent 10,005 yards.

It has already been mentioned that the range counter 36 is set to 10,000 yards, the approximate range of the target. The high-speed binary counter 18 has been reset by the pulse output of comparator 12 and it begins to count starting at the next pulse which passes through gate 16, as shown in FIG. 2e. The high-speed binary counter produces voltages at leads 84 indicative of a binary number. This number is compared with the binary number which has been set into the coarse counter 38 of range counter 36. When the two binary numbers are equal, comparator 40 produces an output pulse $h$ as shown in FIG. 2h. This output pulse begins 100 pulses or 10,000 yards after the binary counter 18 starts counting and it has a duration of slightly less than 200 yards. It is applied to "and" gate 44. During the time of occurrence of pulse $h$, the 101st pulse from the crystal controlled oscillator is applied via lead 45 to the "and" gate 44. The 101st pulse $i$ passes through "and" gate 44 to the tapped delay line 46. The tapped delay line has a number of taps which are equal to the number of binary digits that the interpolation counter 41 can represent. It may be assumed that the interpolation counter has five stages which means that it can represent $2^5$ or 32 binary numbers. The tapped delay line then will also have 32 taps equally spaced along its length. The interpolation counter can count to a total of 100 yards in approximately 3 yard steps. Accordingly, tapped delay line 46 also is one which is capable of producing a delay of 100 yards and each tap on the delay line represents an interval of approximately 3 yards.

It will now be recalled that the target is at 10,005 yards; the range counter 36 has been set to 10,000 yards. Thus, the coarse counter 38 is set to 10,000 yards and the interpolation counter 41 is set to 0 yards. The diode matrix 48, which is shown in detail in FIG. 3 and which will be explained later, permits the interpolation counter 41 to select the appropriate tap on the tapped delay line 46. In the present instance, the interpolation counter 41 represents the number 0. This is equivalent to the first tap on the delay line, that is, the one at the input end of the delay line. Accordingly, the output pulse of the diode matrix will be the one selected from the first tap of the delay line which occurs at exactly 10,000 yards in range. This pulse, which now appears at lead 86, is known as the range gate trigger. It is applied to the gate generator stages 50 where it accomplishes three things. First it triggers the receiver range gate generator. The receiver range gate generator produces a pulse $k$ which preferably has a width double that of the radar transmitted pulse. As a specific example, if the transmitted pulse width is 80–100 yards, the receiver gate width may be of the order of 160 to 200 yards or so. This pulse $k$ is applied via lead 52 to the intermediate frequency stages of the receiver. The function of the pulse is to place the receiver 54 in condition to receive echoes. In other words, the receiver IF stages may be normally held below cut off and the range gate applied to place the IF stages in condition to amplify. In the present specific example, if the range gate is 160 yards wide and starts at 10,000 yards, it will extend from 10,000 to 10,160 yards. The echo pulse is at 10,005 yards and it will therefore pass through the receiver 54 and along lead 60 to the range discriminator 58. This pulse is known in the art as a gated video pulse.

The second and third functions performed by the range gate trigger are to cause the gate generators 50 to produce early and late gates respectively. In the present instance the cross-over point of the early and late gates is at precisely 10,080 yards. The target is under-ranged (actual range is 10,005 yards, whereas the range counter says 10,000 yards) and should occur 5 yards beyond the cross-over point. Thus, either the transmitter trigger pulse must be delayed (by placing a delay line in lead 91) or the echo must be delayed. The latter arrangement is the one shown and includes a delay stage 61 in series with lead 60 to delay the echo pulse an amount sufficient to produce a total delay of 80 yards.

The range discriminator 58 compares the time of occurrence of the cross-over point of the early and late gates and the time of occurence of the echoes. In the present instance the echo is at 10,085 yards and the cross-over point is at 10,080 yards so that the range discriminator 58 produces an output error voltage. The error voltage passes through filter 64 and sense detector 68 to the interpolation counter. Assume that the voltage is positive and that a positive voltage to the sense detector commands the counter to count forward. Accordingly, the signal applied by sense detector 68 to the range counter places it in condition to count forward. The analog voltage-to-pulse converter 70 produces pulses which are applied via lead 72 to the interpolation counter 41. The magnitude of the range error will determine the number of pulses produced by the analog voltage-to-pulse converter 70. After the second pulse, the interpolation counter is at 6 yards so that the range counter is at 10,006 yards. This is the closest value possible, under the conditions outlined, to the target range of 10,005 yards. When interpolation counter 41 is at 6 yards, the diode matrix 48 selects the third tap (the one which produces a pulse delay of 6 yards). During the next radar repetition period, the cross-over point of the early and late gates produced by the pulse generator 50 is at 10,086 yards whereas the pulse at lead 60 is at 10,085 yards, so that the range discriminator 58 which compares this cross-over point with the actual target position produces at lead 62 a small range error voltage. Neglecting noise and assuming a stationary target, the small range error voltage will eventually cause the analog voltage-to-pulse frequency converter 70 to generate a correcting pulse on lead 72 which in turn will cause interpolation counter 41 to select the second tap on delay line 46. The cross-over point will be generated at 10,083 yards. Therefore, the cross-over point will occur at either 10,083 yards or 10,086 yards. The error under these conditions will be less than 3 yards.

The count on range counter 36, which is in straight binary form, may be applied directly to a computer or to a shift register and thence to a computer.

After the operation described above, the crystal-controlled oscillator 14 continues to function and high speed binary counter continues to count the pulses produced by the crystal-controlled oscillator. When the 500th pulse has been counted by the high-speed binary counter, the comparator 12 produces an output pulse $b$. The output pulse of the comparator closes gate 16 and resets high speed counter 18. Gate 16 is then opened after delay introduced by delay line 74. The next pulse from the crystal-controlled oscillator to pass through gate 16 is the 502nd one and it starts the high-speed binary counter counting again. To select the zero range trigger, gate 28 is opened at the appropriate time and then closed by the pulse which it passes. The complete cycle described above is now repeated.

In the system described it is very easy quickly to change the pulse repetition frequency, that is, the maximum radar range of interest. This can readily be done by adjusting the range selector 10. It is thus possible to change the range in 100 yard steps to any value desired—a mode of operation not possible with any other known system.

The accuracy of the system described is limited to some extent by the accuracy with which the oscillator 14 may be maintained stable. However, the stability is such that one is able to reduce errors from this component to about ½ yard at a range of 2,000 miles. As the range of the system is extended, the accuracy is substantially unaffected by the range scale. Thus, for example, if one additional flip-flop is added to high-speed binary counter 18 and the course counter 38, the range can be doubled. These stages introduce no additional range error.

The prior art system mentioned in the introductory portion of this application has a range slewing speed on the order of 50,000 yards per second. The range slewing speed of the present system is of the order of microseconds per several thousand miles.

The discussion which follows gives details of certain circuit components which are shown in block form in FIG. 1. It is to be understood that the specific circuits to be discussed are given by way of example only and are not means to be limiting. In each case there are other circuits which can serve the same purpose.

Comparator

Figure 4A:
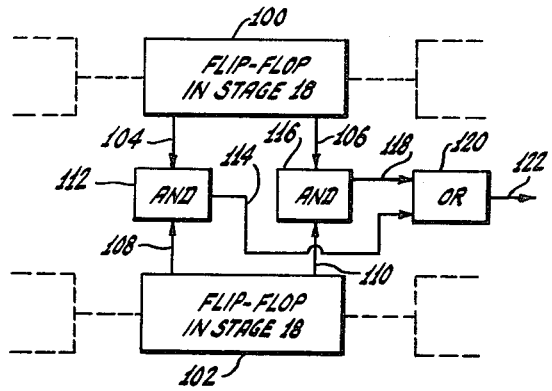
FIGS. 4a and 4b are circuit diagrams of one of the comparators shown in FIG. 1.
Figure 4B:
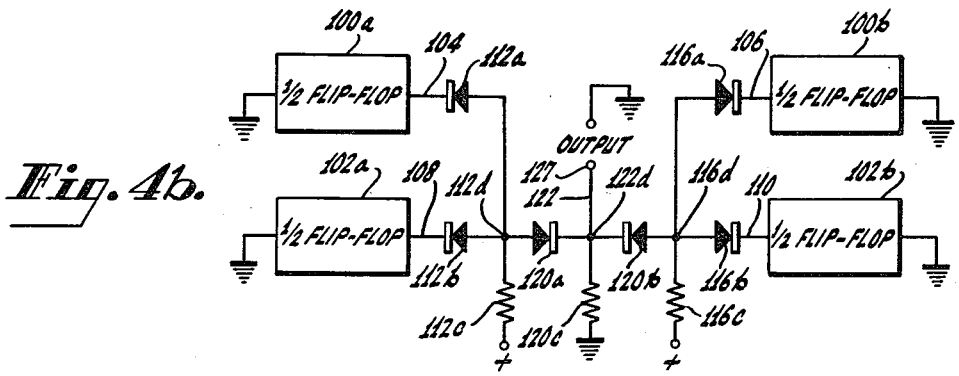

FIGS. 4a and 4b show a portion of a comparator stage such as stage 40 and the manner in which it compares the digits produced by two counters, high-speed counter 18 and range counter 36 in the present instance. Each of the counters is made up of a plurality of flip-flop stages connected in cascade, however, FIGS. 4a and 4b show only one such stage for each counter.

Referring to FIG. 4a, the flip-flop in stage 18 is shown at 100 and the flip-flop in stage 38 is shown at 102. Each stage has two output leads, 104 and 106 in the case of stage 100 and 108 and 110 in the case of stage 102. When leads 104 and 108 are positive, stages 100 and 102 represent the number 1. At this time, leads 106 and 110 may be assumed to be at zero volts. Conversely, when leads 106 and 110 are positive, stages 100 and 102 represent the digit 0. The function of the comparator is to produce an output voltage when stages 100 and 102 represent the same digit. Thus, the comparator must produce an output when both represent the digit 1 and when both represent the digit 0 but it must produce no output when one represents the digit 1 and the other the digit 0.

The comparator comprises a plurality of "and" and "or" circuits. Two "and" and one "or" circuits are required for the comparison of two stages. "And" circuit 112 produces a positive voltage at lead 114 only when the voltage at leads 104 and 108 is positive. In a similar manner, "and" circuit 116 produces a positive voltage at lead 118 only when the voltages at leads 106 and 110 are positive. "Or" circuit 120 produces an output voltage at lead 122 only when one of the voltages applied to the "or" circuit is positive.

A more detailed diagram of the comparator is shown in FIG. 4b. One half of flip-flop 100 is shown at 100a and the other half at 100b. Similarly, half of flip-flop 102 is shown at 102a and the other half at 102b. "And" circuit 112 consists of a pair of diodes 112a, 112b and load 112c connected between a source of positive voltage and the common anode connection 112d. "And" circuit 116 is identical and is illustrated at 116a–d. The "or" circuit 120 consists of a pair of diodes 120a, 120b and a resistor 120c connected between ground and the common cathode connection 120d.

In operation, when leads 104 and 108 are both positive, diodes 112a and 112b do not conduct and a positive voltage appears at common connection 112d. Diode 120a therefore conducts and a positive voltage appears at output lead 122. However, when either lead 104 or 108 is zero, the diode connected to that lead conducts so that common connection 112d is zero and diode 120a does not conduct. If both diodes 120a and 120b do not conduct, lead 122 is ground potential and no output appears. The right portion of the circuits operates in exactly the same manner, that is, when leads 106 and 110 are positive, neither diode 116a nor 116b conducts and a positive voltage appears at lead 122.

If there are $n$ stages in binary counter 18, there will be $n$ lines marked 122. These lines feed into a common "and" gate which gives an output when the binary counter 18 and the coarse counter 38 represent the same numbers. The comparator 40 also includes a shaping stage at its output to produce the pulse $h$ which has the desired amplitude and width. Since the latter stage is well known, it is not shown in detail.

Range Counter 36

The coarse and fine sections of binary counter 36 are identical. As a specific example, let us assume that binary counter 18 has $n$ stages. In this event range counter 36 must have $n$ of its stages for comparison with like stages in comparator 18. These $n$ stages are in block 38 labeled "coarse count." The remainder of the stages in the range counter 36 form the interpolation section and they are used to select taps on the delay line 46. If there are $m$ stages remaining, the number of taps that can be selected is $2^m$. In the specific example discussed, $m=5$ so that $2^m=32$. When pulses are applied to the interpolation counter 41 via lead 72, each pulse causes the interpolation counter to count, that is, to produce a count indicative of a range increment of approximately 3 yards. If there were only four flip-flops in the interpolation counter 41, each pulse applied to the counter would represent six and a fraction yards.

Analog Voltage-to-Pulse Frequency Converter

Figure 5:
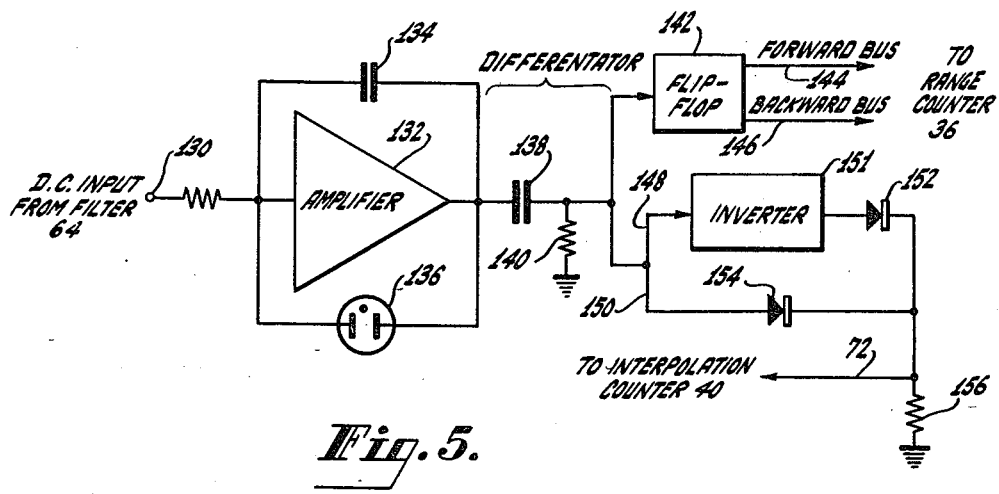
FIG. 5 is a block and schematic circuit diagram of the analog voltage-to-pulse frequency converter shown in FIG. 1.

FIG. 5 shows one form of analog voltage-to-pulse frequency converter circuit which may be used in the system of FIG. 1. The D.C. input from filter 64 is applied to terminal 130. It is applied to an operational amplifier 132 across which are a storage capacitor 134 and a neon bulb 136. Amplifier 132 is capable of amplifying a positive or a negative D.C. voltage. In operation, capacitor 134 is charged either positive or negative depending upon the polarity of the D.C. applied to terminal 130. When the firing voltage of neon tube 136 is reached, the capacitor discharges through it and, after the extinction potential of the neon bulb has been reached, begins again to charge.

Condenser 138 and resistor 140 together comprise a differentiator. The differentiator produces pulses in time coincidence with the discharge of capacitor 134. The polarity of the pulses depends on the polarity of the voltage applied to terminal 130. Thus, if the voltage is positive, the pulses are negative and vice versa. These pulses are fed into a flip-flop 142 which acts as the sense detector 68. In other words, positive pulses place the flip-flop in one state and negative pulses place it into its other state. The output of the flip-flop consists of two buses 144 and 146. The polarity of the buses determines the counting state of range counter 36.

Figure 8:
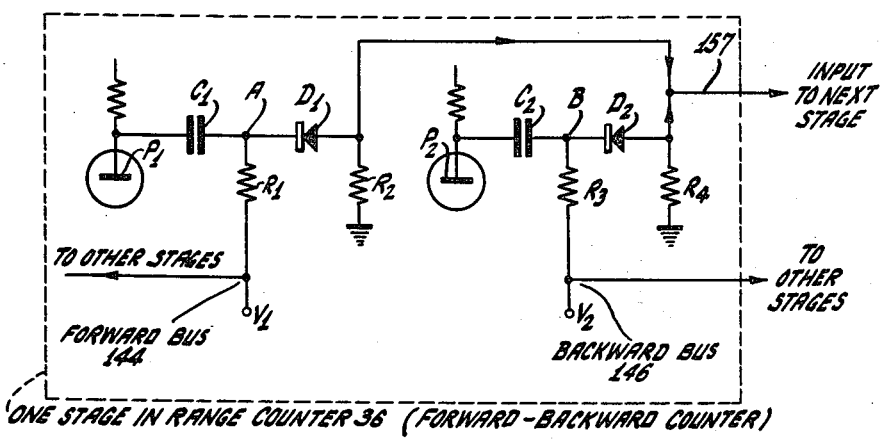
FIG. 8 is a schematic drawing of a stage in the range counter of FIG. 1.

The manner in which the forward and backward buses are connected to the range counter is shown in FIG. 8. It is assumed that a negative pulse is required on lead 157 to trigger the following stage.

If the input to a flip-flop comes from one plate of a preceding flip-flop, range counter 36 is in the forward counting state; if the input is from the other plate of the preceding flip-flop, range counter 36 is in the backward counting state.

When plate $P_1$ goes negative, $C_1$ and $R_1$ differentiate the voltage step and provide a spike at the junction A. If the output of plate $P_1$ is desired as the input for the following flip-flop, the pulse at A must pass through diode $D_1$. Any negative pulse which occurs at junction B must not pass through diode $D_2$. Therefore, the value of $V_2$ is made sufficiently positive so that even with a negative pulse superimposed at B, diode $D_2$ will not conduct. The voltage $V_1$ is zero when diode $D_1$ passes the negative pulse. If plate $P_2$ is to provide the input to the following flip-flop, voltage $V_1$ is made positive and $V_2$ is made zero. A convenient way of controlling $V_1$ and $V_2$ is to use a flip-flop whose plate voltages are $V_1$ and $V_2$. Flip-flop 142 in FIG. 5 supplies $V_1$ and $V_2$.

Returning to FIG. 5, the positive or negative pulses from the differentiator 138, 140 are also applied to a pair of lines 148, 150. The upper line includes an inverter 151 and diode 142 the anode of which is connected to the inverter 151. The second line 150 includes a diode 154 poled similarly to diode 152. In operation, when positive pulses are applied to the circuit, they pass through diode 154 and appear as positive pulses at load 156. When negative pulses are applied to the circuit, they are inverted in stage 151 and are applied as positive pulses to diode 152. These, too, then appear as positive pulses across load 156. In other words, regardless of the polarity of the output pulses of differentiators 138, 140, positive pulses appear at load 156. These are applied via lead 72 to the interpolation counter 41.

Gate

Figure 6:
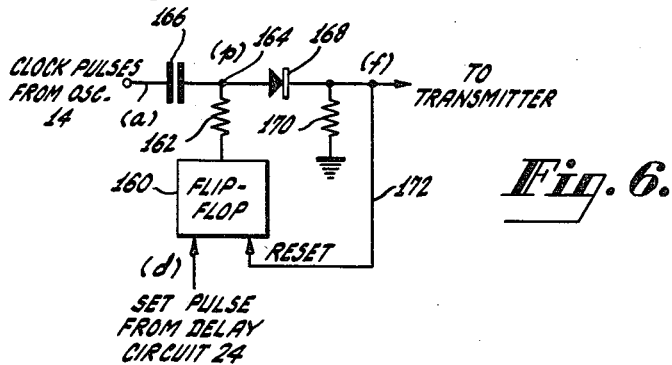
FIG. 6 is a block and schematic circuit diagram of one of the gate circuits shown in FIG. 1.

A typical gate circuit such as may be used for stage 28 of FIG. 1 is shown in FIG. 6. It includes a flip-flop stage 160. The output from the flip-flop circuit is applied via isolating resistor 162 to junction 164. Clock pulses *a* from oscillator 14 are applied through coupling condenser 166 to the same junction. Diode 168 is biased during the quiescent condition of flip-flop 160 to a value such that it does not pass the clock pulses from oscillator 14.

Figure 7:
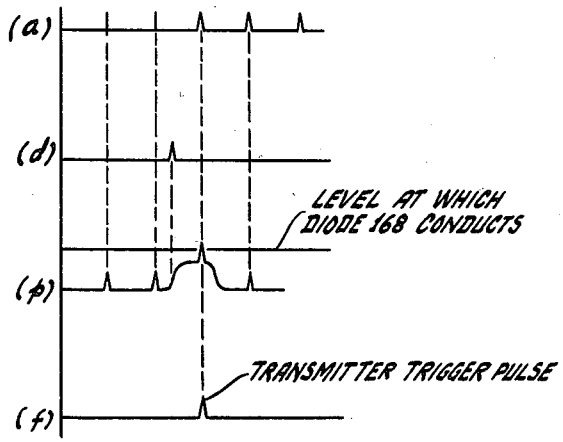
FIG. 7 is a drawing of waveforms present in the circuit of FIG. 6.

In operation, the input to the flip-flop circuit 160 consists of pulses *d* which have been delayed by delay line 74 and further delayed by delay line 24. These cause the flip-flop circuit to produce a positive output. During this interval, the anode of the diode 168 is made more positive, that is, its voltage is increased to a point at which if made slightly more positive, it would conduct. When one of pulses *a* occurs during this period, it will pass through this diode and appear as a short output pulse *f* across load resistor 170. The pulse is used as the transmitter trigger and is also fed back as a second input to the flip-flop circuit over lead 172. This causes the flip-flop output to return to its normal negative value and prevents any further pulses from passing through diode 168. There is sufficient delay built into the circuit so that the pulse out of the flip-flop does not end until *f* has passed. The various waves discussed above are shown in FIG. 7.

Diode Matrix

Figure 3:
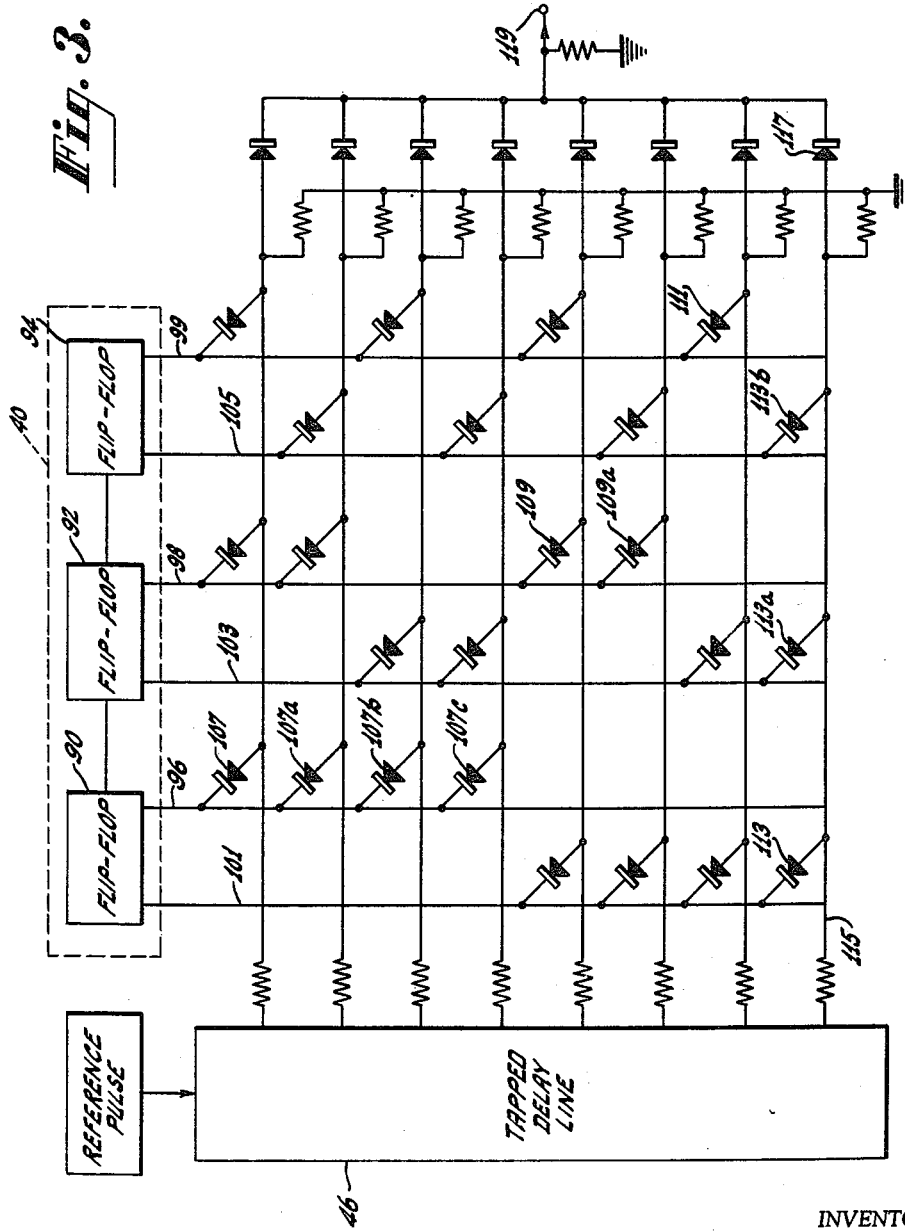
FIG. 3 is a block schematic diagram which gives further details of the diode matrix shown in FIG. 1.

The diode matrix circuit is shown in FIG. 3. For the purposes of explanation, it is assumed that the interpolation counter 41 has only three stages so that it is capable of representing only $2^3$ or 8 binary digits. Accordingly, the tapped delay line 46 has only 8 taps. There are three bistable multivibrator or flip-flop circuits 90, 92, and 94 in the interpolation counter. Each flip-flop has two output leads one of which represents the digit output. These are appropriately labeled in the figure. Let it be assumed that the binary number represented by the interpolation counter is 111 or 8. Under these conditions, there is zero voltage present at leads 96, 98 and 99 and positive voltage present at leads 101, 103 and 105. Since the diodes 107, 107*a*, 107*b* and 107*c* are connected with their cathodes to lead 96 (zero volts), they all conduct when a positive pulse is sent down delay line 46. Similarly, diodes 109 and 109*a* conduct and diode 111 conducts. Accordingly, pulses appearing on all taps of the delay line except the last one 115 are bypassed by a conducting diode. The last diodes 113, 113*a*, and 113*b* do not conduct. Thus, the delayed pulse appearing on tap 115 is applied through diode 117 to the output terminal 119. The latter goes to the gate generators 50.

An analysis similar to the above can be made for the remaining taps. The diode matrix functions to select the tap on the delay line which represents the binary number equal to the binary number represented by the interpolation counter 41.

Target Acquisition

In the discussion above it has been assumed that the input target range information applied to lead 34 is sufficiently accurate so that the target falls within the early or late gate. In this case, the target is acquired immediately. It is to be understood however, that the invention is also operative in event that the input information is not accurate. In this case, it is necessary to slew the range gate applied to the receiver to a position such that the target position is within the range gate. When this occurs, the automatic circuits already described take over and position the cross-over point of the early and late gates at the target position.

There are a number of slewing circuits which may be used in the present invention. One simplified method of sweeping the range gate is as follows. Range counter 36 is put into one of its two possible counting states. Line 66 is then opened and a D.C. voltage from an external source is applied to the analog voltage-to-pulse frequency converter 70. The latter then generates pulses at a constant rate. Range counter 36 counts the pulses, changing its range reading approximately three yards for each pulse. However, if desired, any number of stages can be bypassed thus increasing the range change per pulse. For example, if the pulses enter the stage next to the least significant stage, the change in range will be 6¼ yards per pulse. If all the interpolation stages are bypassed, the change in range will be 100 yards per pulse, etc. The counter can, of course, be made to count in the opposite direction by changing the polarity of the D.C. on the output lead of the sense detector 68.

Many other range slewing systems either manual or preferably automatic may be used in the present invention. However, since details of these are not needed for an understanding of the present invention, they are not described in detail.

What is claimed is:

1. In a radar system, means for producing a binary number representative of a selected maximum range; means for producing a second binary number the value of which increases as a function of time; means for comparing the two binary numbers and, in response to said two binary number bearing a predetermined relationship, producing an output signal; and means responsive to said output signal for transmitting a radar pulse.

2. In a radar system as set forth in claim 1, further including means for changing the binary number representative of a selected maximum range.

3. In a radar system, means for producing a binary number representative of a selected maximum range; means for producing a second binary number the value of which increases as a function of time; means for comparing the two binary numbers and, in response to said two binary members being equal, producing an output signal and resetting the second binary number producing means; and means responsive to said output signal for transmitting a radar pulse.

4. In a radar system, means for producing a first binary number representative of the range of a target of interest; means for producing a second binary number the value of which increases as a function of time; and means for comparing the two binary numbers and, in response to said two binary numbers bearing a predetermined relationship, producing a gate which brackets the target.

5. In a radar tracking system, means for producing a first binary number representative of the range of a target of interest; means for producing a second binary number the value of which increases as a function of time; means for comparing the two binary numbers and, when they are equal, producing a gate which brackets the target; means for producing a third binary number representative of the maximum radar range of interest; means for comparing the second and third binary numbers and, when they are equal, producing an output signal and resetting the means producing said second binary number; and means responsive to said output signal for transmitting a radar pulse.

6. In a radar system, means for producing the binary number representative of a selected maximum range; means including a stable oscillator and a binary counter for producing a second binary number, the value of which increases as a function of time; means for comparing the two binary numbers and, in response to said two binary numbers bearing a predetermined relationship, produce an output signal; and means responsive to said output signal for transmitting the radar pulse.

7. In a radar system, means for producing a first binary number representative of the range of a target of interest; means for producing a second binary number, the value of which increases as a function of time; means for comparing the two binary numbers and, in response to said two binary numbers being equal, producing a first signal which occurs at the time equivalent of the range of the target of interest; means for receiving an echo from the target of interest at the time equivalent of the target range; and means for comparing the times of occurrence of the first signal and the echo signal and, in response to said times of occurrence being different, correcting the first binary number in a sense to reduce said difference to zero.

8. In a radar system, a range counter for producing a binary number representative of the range of the target of interest, said counter including a reference counter which is capable of counting in coarse steps and an interpolation counter, each digit of which represents a fraction of one of the digits of the reference counter; means for producing a second binary number the value of which increases as a function of time; means for receiving an echo from the target of interest; means for comparing the two numbers and, when they are approximately equal, producing a tracking signal at the approximate target range; means for comparing the time of occurrence of the echo signal with that of the tracking signal and, when they are different, producing an error quantity; and means for supplying said error quantity to said interpolation counter to correct the first binary number in a sense and amount that it represents substantially the exact target range.

9. In a radar system, means for producing a digital number representative of substantially the exact target range; means for producing a signal at the approximate target range; a tapped delay line to which the signal is applied, one tap of which represents substantially the exact target range; and means responsive to said digital number for selecting said tap.

10. An automatic tracking radar system comprising, means for transmitting pulses to a target and receiving echoes therefrom; counter means for producing a digital number indicative of the approximate target range; and means responsive to the difference between the range represented by the digital number and the range represented by the received echo for applying pulses to said counter means in a sense to reduce said difference.

11. In a radar system, means for producing a first physical effect representing a digital number representative of a selected maximum range; means for also producing a second physical effect representing a second digital number the value of which increases as a function of time; means for comparing said first and second physical effects to thereby compare the two digital numbers and, in response to their bearing a predetermined relationship, producing an output signal; and means responsive to said output signal for transmitting a radar pulse.

12. In a radar system, means for producing voltages representing a first digital number that is representative of a selected maximum range; means for also producing voltages representing a second digital number the value of which increases as a function of time; means for comparing said voltages representative of said two digital numbers to thereby compare the two digital numbers and, in response to their bearing a predetermined relationship, producing an output signal; and means responsive to said output signal for transmitting a radar pulse.

13. In a radar system, means for producing a first digital number representative of the range of a target of interest; means for producing a second digital number the value of which increases as a function of time; and means for comparing the two digital numbers and for producing a gate which brackets the target in response to said two digital numbers bearing a predetermined relationship.

14. In a pulse radar system, means for producing a first digital number representative of the range of a target of interest; means for producing a second digital number, the value of which increases as a function of time; means for comparing the two digital numbers and, in response to said two numbers bearing a predetermined relationship, producing a first signal which occurs at the time equivalent of the range of the target of interest; means for receiving a pulse from the target of interest at the time equivalent of the target range; and means for comparing the times of occurrence of the first signal and the received pulse and, in response to said times being different, correcting the first digital number in a sense to reduce said difference to zero.

15. In combination, means for producing a first digital number representative of a selected timing of a gate pulse; means for producing a second digital number, the value of which increases as a function of time; means for comparing the two digital numbers and, in response to their bearing a predetermined relationship to each other, producing a first signal, means for producing said gate pulse in response to the occurrence of said first signal; means for receiving a second signal which varies in timing with respect to said gate pulse; and means for comparing the times of occurrence of the gate pulse and the second signal and, when they are different, correcting the first digital number in a sense to reduce said difference to zero.

16. In a pulse echo system, a first counter means for producing recurrent pulses, means responsive to said pulses for transmitting to an object recurrent pulses; means for receiving a pulse from said object in response to said transmission during a brief interval of the time between said transmitted recurrent pulses; and means responsive to the time of receipt of said received pulse in said interval to vary the time of occurrence of said interval to maintain agreement between receipt of said received pulse and occurrence of said interval; said last means comprising a second counter means, means for comparing the count settings of said two counter means as said first counter means operates to produce said recurrent pulses, and for producing, in response to the occurrence of a predetermined relation between said count settings, a pulse that determines the timing of said brief interval, and means for varying the count setting of said second counter means as a function of said time of receipt.

17. Means at an observation point for measuring a variable distance between said point and an object distant therefrom; comprising a first counter means at said point for producing recurrent pulses; means responsive to said recurrent pulses for transmitting to said object a train of pulses or waves of energy spaced apart in time; means at said point for receiving pulses from said object in response to said transmission; means for generating pairs of auxiliary pulses at times bearing a known relation to the times of transmitting the pulses of said train of pulses; said last means comprising a second counter means, means for comparing the count settings of said two counter means as said first counter means operates to produce said recurrent pulses and for producing an output pulse in response to the occurrence of a predetermined relation between said count settings, means for generating a pair of said auxiliary pulses in response to the occurrence of said output pulse; and means for changing the count setting of said second counter means as a function of the time relation between said pairs of auxiliary pulses and said received pulses.

18. In a radar system, means for producing a first binary number representative of the range of a target of interest; means for producing a second binary number, the value of which increases as a function of time; means for comparing the two binary numbers and when they are equal producing a first signal which occurs at the time equivalent of the range of the target of interest; means for receiving an echo from the target of interest at the time equivalent of the target range; and means for comparing the times of occurrence of the first signal and the echo signal and, when they are different, correcting the first binary number in a sense to reduce said difference to zero, said means for producing said first binary number comprising a counter which is capable of counting forward or backward.

References Cited in the file of this patent

UNITED STATES PATENTS

| | | |
|---|---|---|
| 2,433,385 | Miller | Dec. 30, 1947 |
| 2,740,112 | Goldberg | Mar. 27, 1956 |
| 2,816,226 | Forest et al. | Dec. 10, 1957 |

FOREIGN PATENTS

| | | |
|---|---|---|
| 750,005 | Great Britain | June 6, 1956 |